United States Patent
Hammell et al.

(10) Patent No.: US 8,520,653 B2
(45) Date of Patent: Aug. 27, 2013

(54) PACKET-BASED COMMUNICATION SYSTEM AND METHOD

(75) Inventors: Jonathan F. Hammell, Ottawa (CA); Michael Kenneth Brown, Fergus (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/616,203

(22) Filed: Sep. 14, 2012

(65) Prior Publication Data

US 2013/0007770 A1 Jan. 3, 2013

Related U.S. Application Data

(63) Continuation of application No. 13/094,939, filed on Apr. 27, 2011, now Pat. No. 8,325,700, which is a continuation of application No. 12/118,285, filed on May 9, 2008, which is a continuation of application No. 10/887,877, filed on Jul. 12, 2004, now Pat. No. 7,372,841.

(51) Int. Cl.
*G06F 9/44* (2006.01)

(52) U.S. Cl.
USPC .......................................... 370/342; 370/469

(58) Field of Classification Search
USPC ........... 455/435.1, 445, 554.1, 560; 370/469, 370/474, 493–495, 342; 364/705.05, 708.1
See application file for complete search history.

(56) References Cited

U.S. PATENT DOCUMENTS

| | | | |
|---|---|---|---|
| 5,497,339 A | 3/1996 | Bernard | |
| 6,385,199 B2 | 5/2002 | Yoshimura et al. | |
| 7,372,841 B2 | 5/2008 | Hammell et al. | |
| 2004/0081202 A1 | 4/2004 | Minami et al. | |
| 2011/0058568 A1 | 3/2011 | Hammell et al. | |

FOREIGN PATENT DOCUMENTS

| | | |
|---|---|---|
| CA | 2511047 | 3/2008 |
| EP | 1617618 | 3/2007 |
| HK | 1086404 | 6/2007 |
| WO | 02/19637 | 3/2002 |

OTHER PUBLICATIONS

Sockets http://h30097.www3.hp.com/docs/base_doc/DOCUMENTATION/V40E_HTML/APS2WDTE/DOCU_010.HTM Retrieved from internet on or before Jul. 15, 2005.
European Communication pursuant to Article 96(2) EPC; Application No. 04103295.4; Ref. No. 1082-0073, dated Apr. 20, 2006.
European Communication under Rule 51(4) EPC. Application No. 04103295.4. Dated Dec. 1, 2006.
Notice of Allowance. U.S. Appl. No. 12/118,285. Dated Feb. 22, 2011.

(Continued)

*Primary Examiner* — Sam Bhattacharya
(74) *Attorney, Agent, or Firm* — Bereskin & Parr LLP/S.E.N.C.R.L. s.r.l.

(57) ABSTRACT

A system and method for facilitating communication of packets between one or more applications residing on a first computing device and at least one second computing device. The system comprises a connection manager adapted to receive packets from the at least one second computing device, and a packet cache for storing packets received by the connection manager. The connection manager, upon receiving a packet from a second computing device, transmits the packet to the packet cache for storage and notifies each of the applications of receipt of the packet. Subsequently, the packet is retrievable from the packet cache by a notified application, and verification that the packet is intended for communication to the notified application is made.

23 Claims, 6 Drawing Sheets

(56) References Cited

OTHER PUBLICATIONS

Canadian First Office Action for Canadian Patent Application No. 2,516,754 dated Jul. 28, 2009.
Canadian Second Office Action for Canadian Patent Application No. 2,516,754 dated Nov. 1, 2010.
Canadian Notice of Allowance for Canadian Patent Application No. 2,516,754 dated May 6, 2011.
European Search and Exam Report for European Patent Application No. 04103295.4 dated Dec. 27, 2004.
European Decision to Grant for European Patent Application No. 04103295.4 dated Mar. 1, 2007.
Office Action. U.S. Appl. No. 12/118,285. Dated: Jun. 21, 2013.

PACKET-BASED COMMUNICATION SYSTEM AND METHOD

CROSS-REFERENCE TO RELATED APPLICATIONS

This application is a continuation of U.S. patent application Ser. No. 13/094,939, filed Apr. 27, 2011, which is a continuation of U.S. patent application Ser. No. 12/118,285, filed May 9, 2008, which is a continuation of U.S. patent application Ser. No. 10/887,877, filed Jul. 12, 2004. U.S. patent application Ser. No. 10/887,877 issued to patent as U.S. Pat. No. 7,372,841. The entire contents of application Ser. No. 13/094,939, application Ser. No. 12/118,285, and application Ser. No. 10/887,877, are hereby incorporated by reference.

FIELD OF THE INVENTION

The present invention relates generally to packet-based communication systems, and more specifically to a system and method for managing communications between computing devices.

BACKGROUND OF THE INVENTION

Internet protocols exist that govern packet-based communications between a host computing device and a client computing device. For example, in an Internet Protocol Security (IPsec) based virtual private network (VPN), packets relating to the exchange of keys used for encrypting and authenticating data, and packets relating to the exchange of the data itself are typically communicated between the host and client computing devices. In establishing a connection between the host and client computing devices, the keys associated with the connection are generally exchanged between the devices before the data is exchanged.

In some circumstances, multiple components (e.g. applications or application threads) residing on a client computing device may need to be in communication with one or more host computing devices within a given time period. Multiple connections between the host and client computing devices, over the same port or over different ports, may need to be established to facilitate such communications. To properly manage the connections, communications associated with the different components need to be kept separate, since they are potentially at different stages (e.g. of a key or data exchange).

Furthermore, the connections established between the host and client computing devices generally have limited lifetimes. This typically results in a periodic change of keys associated with each connection. Therefore, to properly manage the connections, communications protected by different security parameters (e.g. different keys), over one or multiple ports, also need to be kept separate.

The manner in which communications over multiple connections between a client computing device and one or more host computing devices in a VPN should be managed, however, is not explicitly addressed by current protocols commonly in use, such as IPsec.

SUMMARY OF THE INVENTION

Embodiments of the invention are generally directed to a system and method for managing communications between computing devices that facilitate packet-based communications over multiple connections between a client computing device and one or more host computing devices.

In one broad aspect of the invention, there is provided a system for facilitating communication of packets between one or more applications residing on a first computing device and at least one second computing device, the system comprising: a connection manager adapted to receive packets from the at least one second computing device; and a packet cache, coupled to the connection manager, for storing packets received by the connection manager; wherein, in operation, upon receiving a packet from a second computing device, the connection manager transmits the packet to the packet cache for storage and notifies each of the one or more applications of receipt of the packet; wherein the packet is retrievable from the packet cache by a notified application, and verification that the packet is intended for communication to the notified application is made.

In another broad aspect of the invention, there is provided a method of facilitating communication of packets between one or more applications residing on a first computing device and at least one second computing device, the method comprising the steps of: receiving a packet from a second computing device; transmitting the received packet to a packet cache for storage; notifying each of the one or more applications of receipt of the received packet; upon request of a notified application, retrieving the received packet from the packet cache; and verifying if the received packet is intended for communication to the notified application.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
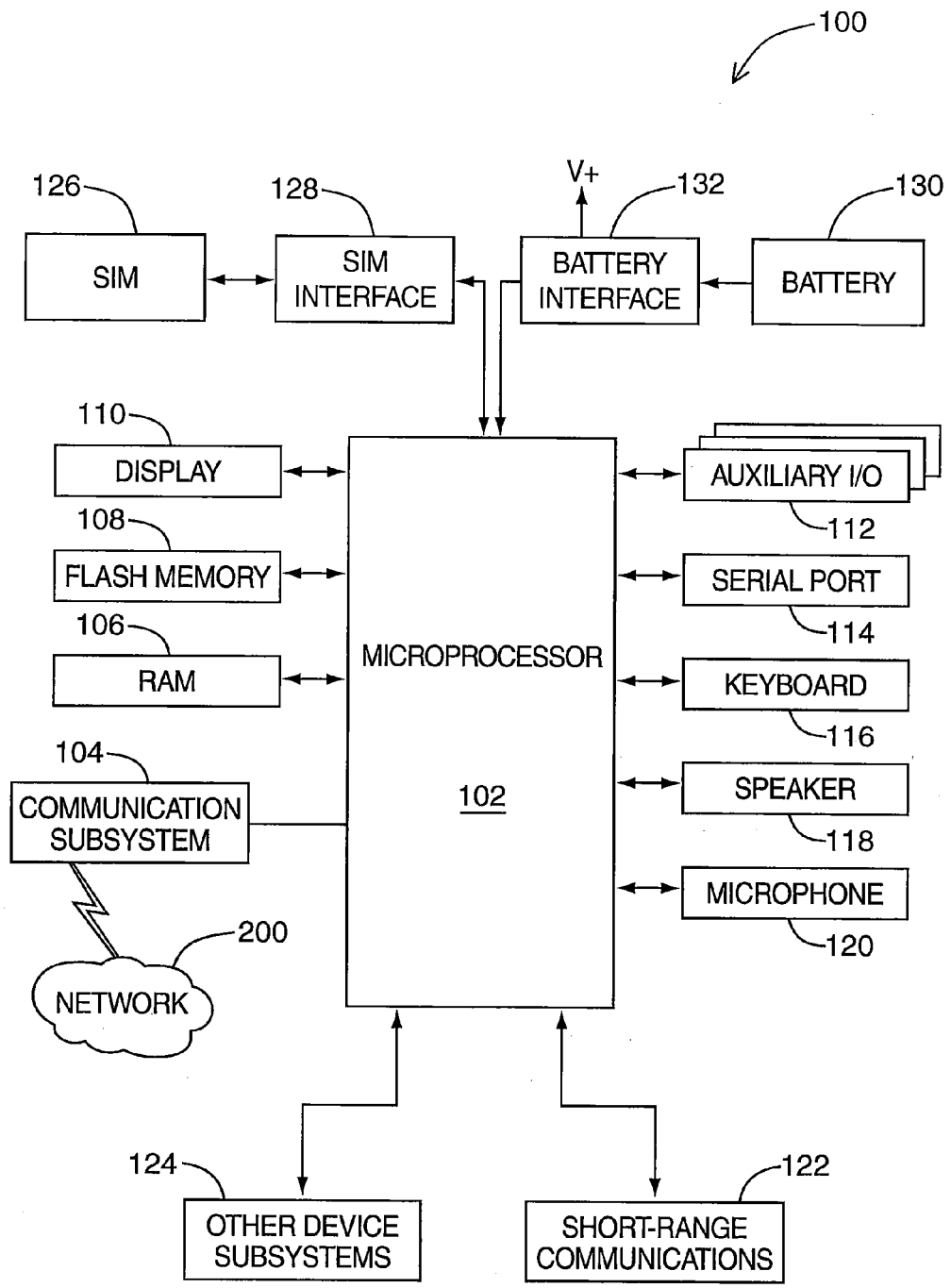
FIG. 1 is a block diagram of a mobile device in one example implementation.
Figure 2:
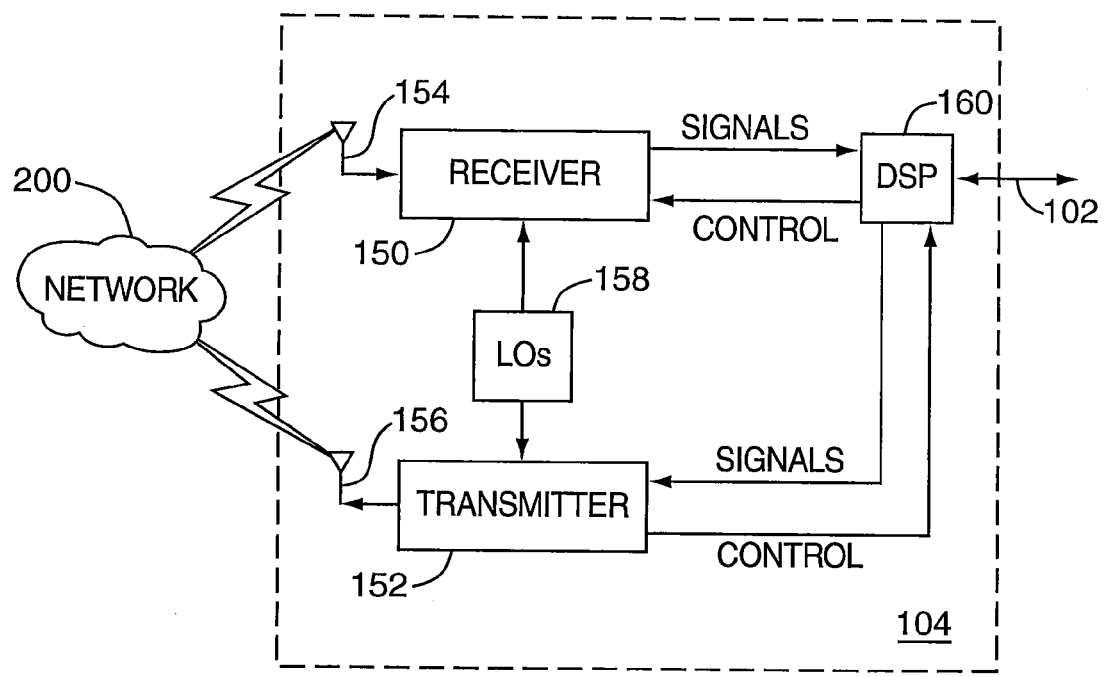
FIG. 2 is a block diagram of a communication subsystem component of the mobile device of FIG. 1.
Figure 3:
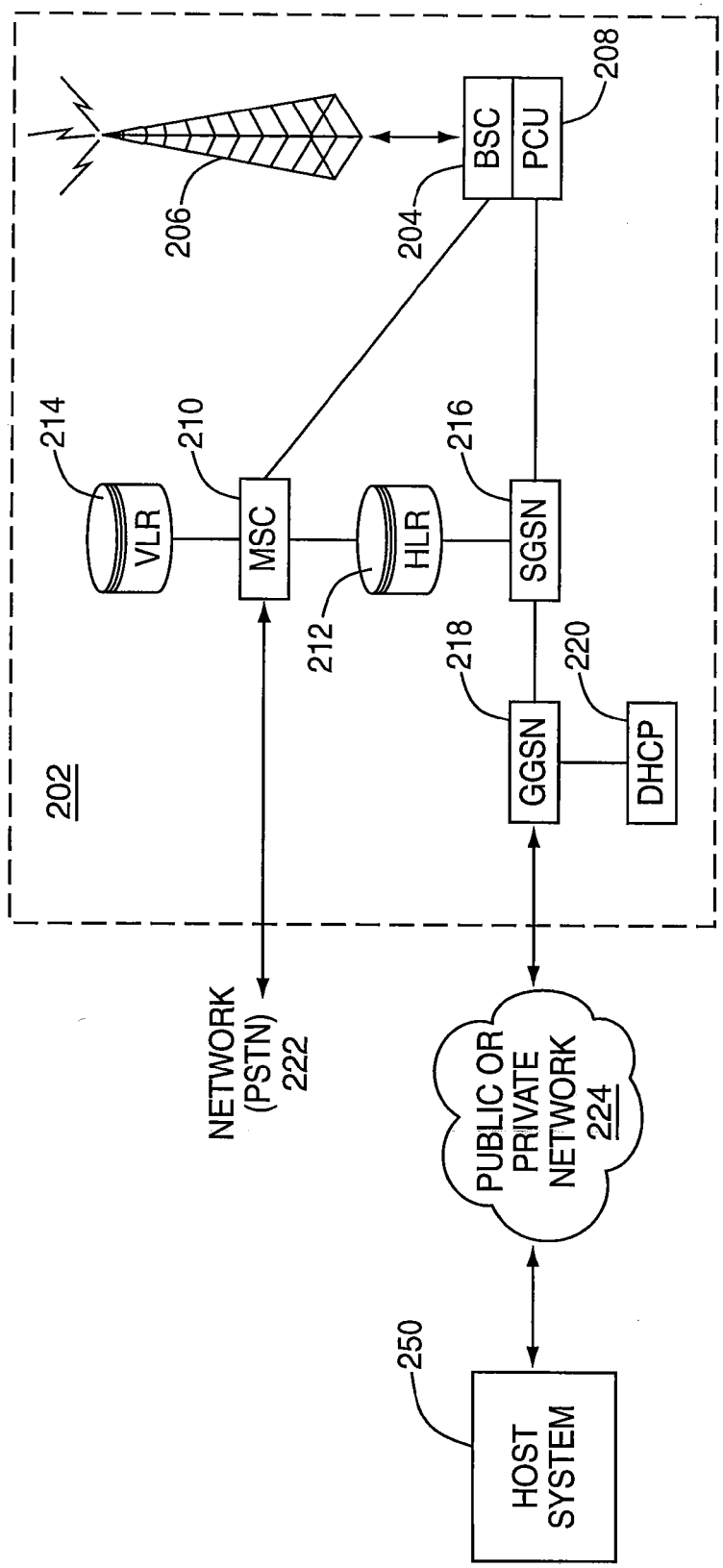
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as email, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

In one example implementation of the invention in which a VPN is established, the IP packets are exchanged with a host system 250 over the public or private network (e.g. Internet) 224 (also referred to herein as a "shared network" or "shared network infrastructure"). This example implementation is described in further detail with reference to FIG. 4.

Figure 4:
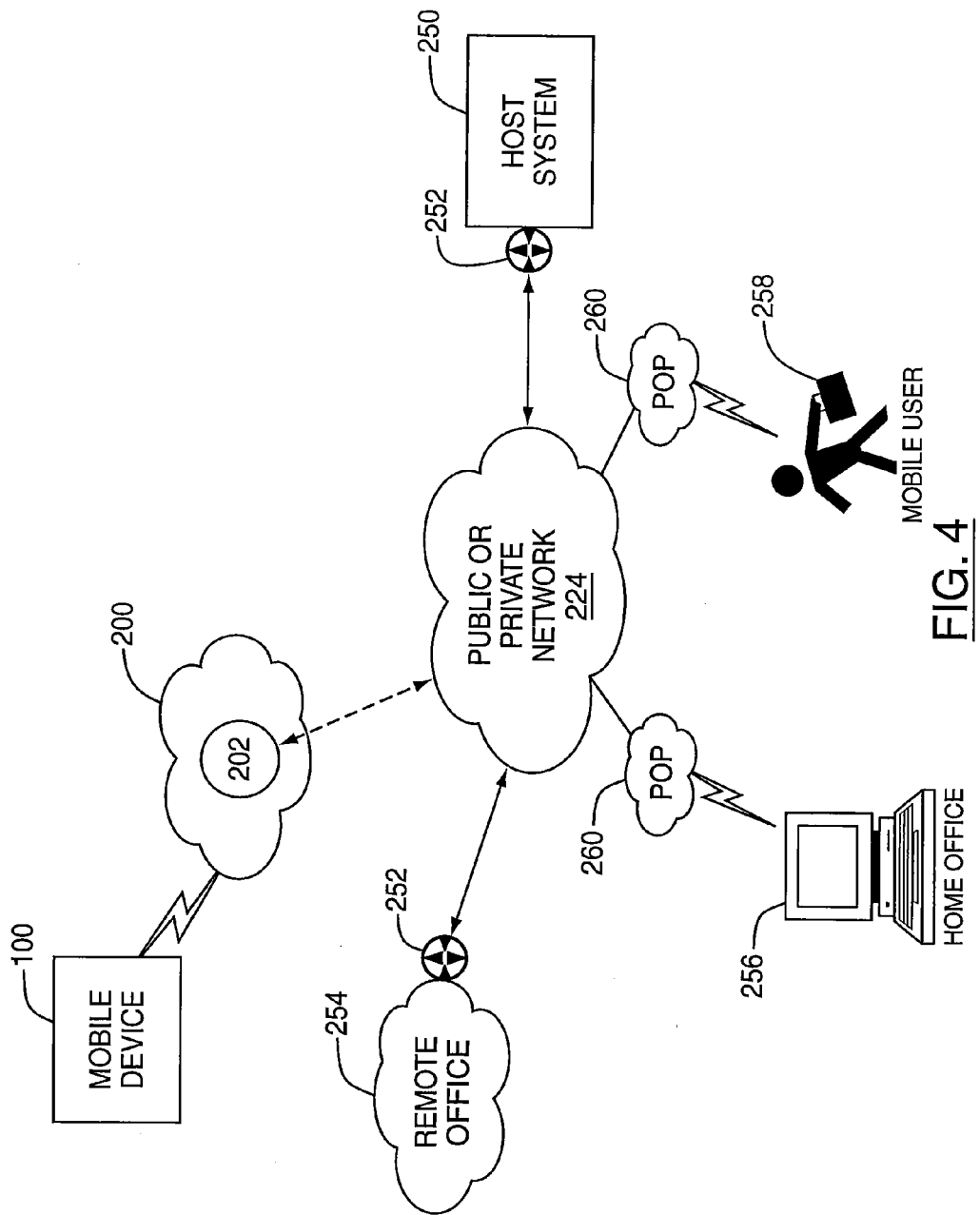
FIG. 4 is a block diagram of an example topology of a virtual private network.

Referring now to FIG. 4, a block diagram of an example topology of a virtual private network is shown. In this example topology, mobile device 100 communicates with host system 250 through a node 202 of wireless network 200 and a shared network infrastructure 224 such as a service provider network or the public Internet. Host system 250 may be a host or desktop computing device, or it may consist of a network of computing devices. Access to host system 250 may be provided through a router 252, and computing devices of host system 250 may operate from within a firewall [not shown].

In a variant implementation, host system 250 may comprise a wireless VPN router to facilitate data exchange between the host system 250 and mobile device 100. The concept of a wireless VPN router is new in the wireless industry and implies that a VPN connection can be established directly through a specific wireless network to a mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device 100, making it possible to push information to a mobile device 100 at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to the mobile device 100 in this variant implementation.

Embodiments of the invention may be employed in implementations where packets are exchanged in communications between mobile device 100 and host system 250. However, it will be understood by persons skilled in the art that certain embodiments of the invention may be employed in implementations where computing devices other than mobile device 100 are to communicate with host system 250, within a VPN or otherwise.

For instance, embodiments of the invention may be employed in various different types of VPN topologies. For example, an intranet site-to-site VPN may connect a local area network at a remote office 254 or other remote location (through which access may be provided through a router 252) to host system 250 over the shared network 224. By way of further example, a remote-access VPN may connect remote users at a home office 256 or other mobile user 258 to host system 250, via a point-of-presence (POP) connection 260 through which the shared network 224 is accessed (e.g. by dial-up access). Other sites [not shown] may also communicate with host system 250 through an extranet-based VPN, as a further example.

Each of the above VPN applications is supported by secure, network-to-network, host-to-network, or host-to-host tunnels, which are virtual point-to-point connections. Tunnels may exist at several protocol layers. For example, certain tunnels provide IP-based virtual connections. In this approach, normal IP packets are routed between tunnel endpoints that are separated by some intervening network topology. Tunneled packets are wrapped inside headers that provide message integrity and confidentiality. In this regard, IPsec is a set of protocols defined by the Internet Engineering Task Force (IETF) that may be used to provide IP security at the network layer.

An IPsec-based VPN is made up of two parts: an Internet Key Exchange protocol (IKE) and IPsec protocols for data exchange. The first part, IKE, is the initial negotiation phase where the two VPN endpoints agree on which methods will be used to provide security for the underlying IP traffic. Session keys for the encryption and authentication algorithms employed are distributed. IKE is also used to manage connections by defining a set of security associations for each connection. The second part, the IPsec protocols, describes how the data will be processed. These protocols include Authentication Header (AH) and Encapsulating Security Payload (ESP), for example. The foregoing is not intended to be a complete description of IPsec and VPNs, as will be understood by persons skilled in the art.

It will also be understood by persons skilled in the art that implementations of embodiments of the invention may be employed for applications other than in the establishment of VPNs, and with the use of other packet-based communication protocols not mentioned above.

Figure 5:
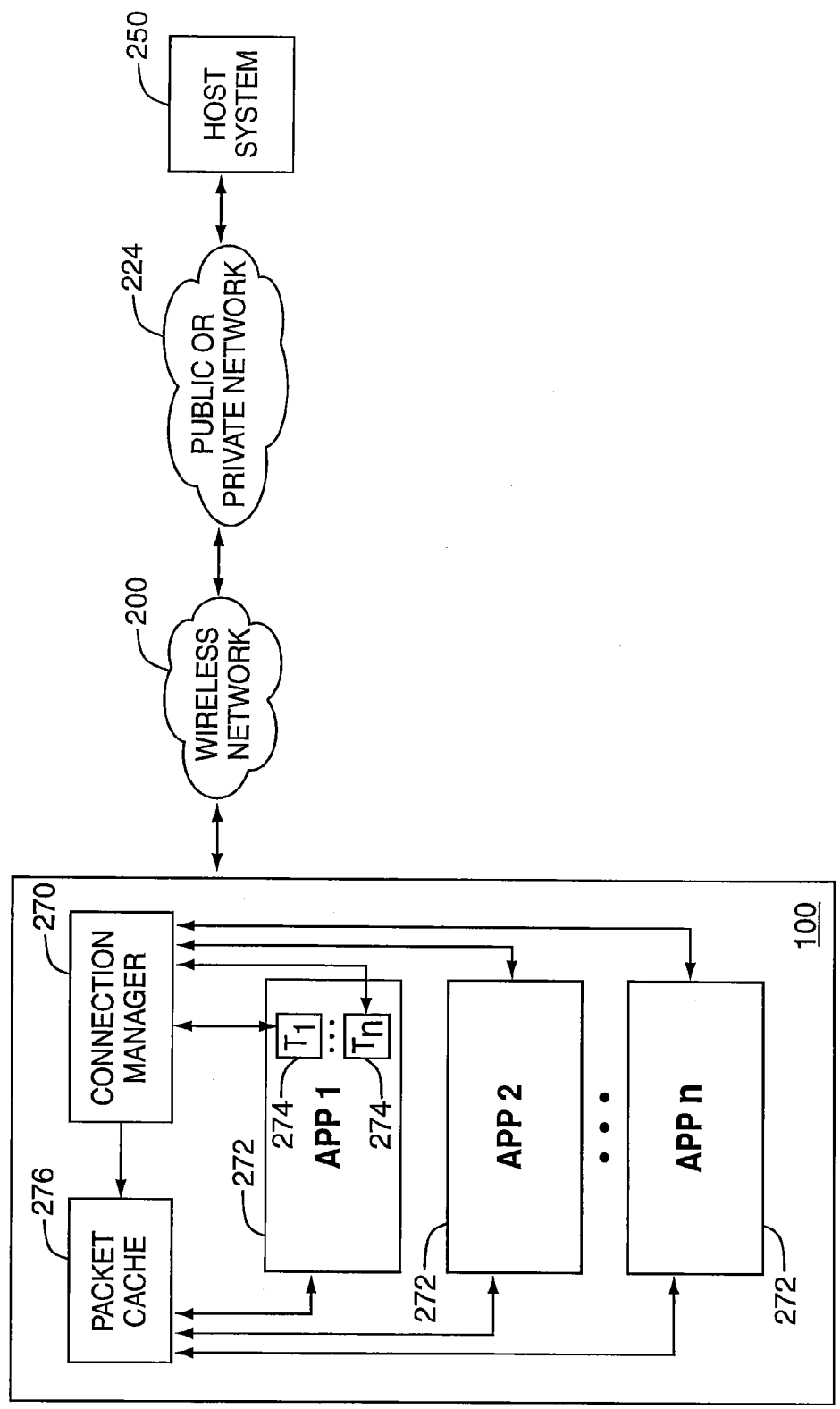
FIG. 5 is a block diagram of a mobile device comprising components enabling packet-based communication with a host system in an embodiment of the invention.

Referring to FIG. 5, a block diagram of a mobile device comprising components enabling packet-based communication with a host system in an embodiment of the invention is shown. For ease of exposition, only a subset of components of the mobile device is illustrated in describing this embodiment of the invention.

As indicated earlier, although this embodiment is described with reference to a mobile device, applications of the invention are not limited to implementations employing mobile devices. In variant embodiments of the invention, a computing device other than a mobile device that is to communicate with the host system can be employed.

Software is hosted on mobile device 100 and host system 250 to implement a VPN. In accordance with this embodiment, the software on mobile device 100 implements a connection manager 270 through which communications to and from host system 250 are managed. Connection manager 270 functions to transmit packets to the host system 250 and receive packets from the host system 250 via wireless network 200 and shared network 224. Each connection to the host system 250 may be made through a selected port of one or more ports on mobile device 100, to a specific port of one or more ports on host system 250.

An application 272 or a thread 274 of an application that is executing and resides on mobile device 100 may request that communication with host system 250 be established. Multiple applications 1 . . . n may be executing on mobile device 100, and multiple threads 1 . . . n of an application may also be executing, each independently requiring communication with host system 250.

For ease of exposition in the following description, applications 272 and threads 274 will be referred to collectively as applications 272. Accordingly, the term "application" as used herein in the specification and in the claims can refer generally to an application 272 or to a specific thread 274 of an application 272.

An application 272 may register with connection manager 270 if it wishes to communicate with host system 250. Connection manager 270 opens incoming and outgoing connections as required. Each application 272 becomes a "packet listener" once registered, and all packet listeners are tracked by connection manager 270.

When an application 272 wishes to send a packet to host system 250, it passes the outgoing packet to connection manager 270, which chooses the appropriate outgoing connection through which the outgoing packet is to be sent. This may require selection of an appropriate port on mobile device 100 through which to transmit the outgoing packet.

When an incoming packet arrives from host system 250, the incoming packet is received by connection manager 270, which monitors the ports of mobile device 100. The received packet is then transmitted by connection manager 270 to a packet cache 276 for storage. Connection manager 270 assigns to each received packet a cache-unique identifier, to assist in tracking the packets stored in packet cache 276, and to facilitate subsequent retrieval of packets (e.g. by applications 272) from packet cache 276. Were the packet cache 276 tracks available identifiers, a call may be made by connection manager 270 to packet cache 276 through an appropriate interface thereof, to retrieve and reserve an identifier for the received packet.

After the received packet is stored in packet cache 276, connection manager 270 then notifies all packet listeners (i.e. all applications 272 that have registered with connection manager 270) that it has received a packet from host system 250. In this embodiment of the invention, the notification comprises the associated identifier assigned to the received packet.

Each application 272 that is a packet listener can decide what actions to take upon receipt of the notification. If a particular application 272 is not expecting a packet from host system 250, that application or thread may ignore the notification.

However, if a particular application 272 is expecting a packet from host system 250, it can request and retrieve the packet associated with the received identifier from packet cache 276, to verify that the packet is intended for that particular application 272.

The verification process performed by the application 272 requesting the packet, may comprise checking the headers and sequence numbers contained in the packet, for example. If the packet does not pass the verification process, the particular application 272 can wait for another incoming packet notification from connection manager 270. On the other hand, if the packet is successfully verified, the particular application 272 can inform packet cache 276 that the packet is being used, allowing packet cache 276 to remove the packet from its store and to release the associated identifier.

In this embodiment, packets are retrieved directly from packet cache 276 by an application 272 that employs its own verification process (which may differ from application to application) to verify packets. However, in a variant embodiment of the invention, packet cache 276 may be adapted to perform verifications on behalf of an application 272, by receiving data necessary to verify a packet, and releasing the packet to the application 272 only if the verification is successful. In another variant embodiment of the invention, connection manager 270 does not pass the identifier to applications 272 in its notifications, but instead retains the identifier in memory. Notified applications 272 may then request and retrieve packets from packet cache 276 indirectly through connection manager 270, and verifications may be made either by notified applications 272, by packet cache 276, or by connection manager 270 depending upon the particular implementation.

It will be understood by persons skilled in the art that while certain components (e.g. connection manager 270, packet cache 276) are shown as being contained within a single computing device that is to communicate with the host system, in variant embodiments of the invention, these components may be distributed over a number of different computing devices. The different devices over which the components are distributed may be within the same secure network or may not be within the same secure network, although configurations of the former type may be more desirable than the latter from a security perspective in such variant embodiments.

It will also be understood by persons skilled in the art that host system 250 may consist of a single computing device, or may comprise multiple computing devices. Furthermore, in variant embodiments of the invention, connection manager 270 may communicate with multiple host systems 250, through one or multiple ports on each computing device of each host system 250.

Connection manager 270 may also implement additional security mechanisms to be applied to communications made over specific connections to one or more host systems 250.

Figure 6:
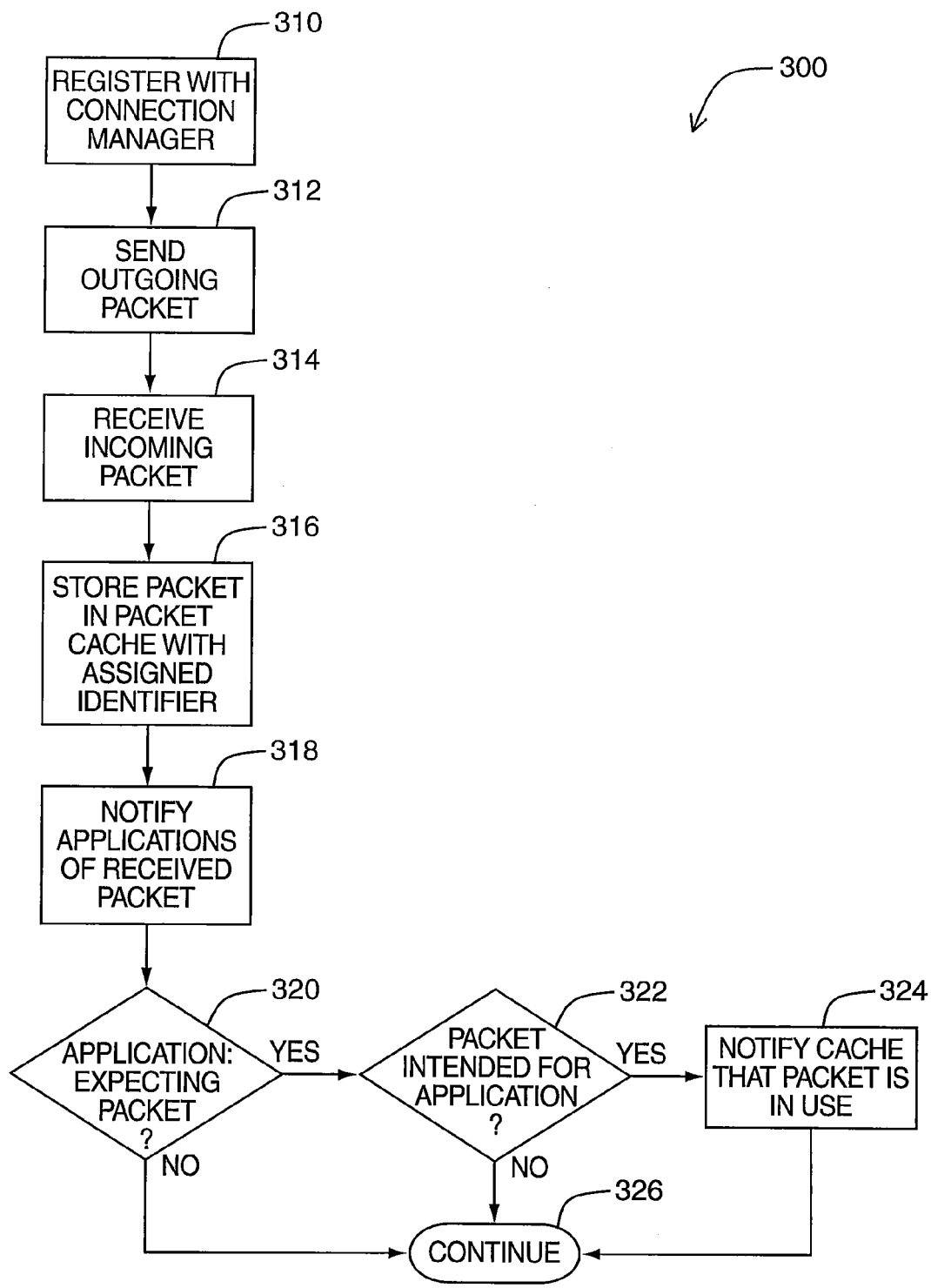
FIG. 6 is a flowchart illustrating steps in a method of facilitating communication of packets between one or more applications residing on a first computing device and at least one second computing device in an embodiment of the invention.

Referring to FIG. 6, a flowchart illustrating steps in a method of facilitating communication of packets between one or more applications residing on a first computing device and at least one second computing device in an embodiment of the invention is shown generally as 300.

At step 310, applications (e.g. applications 272 or application threads 274 of FIG. 5) on a first computing device register with a connection manager (e.g. connection manager 270 of FIG. 5). Outgoing and incoming connections to at least one second computing device on one or more host systems (e.g. host system 250 of FIG. 5) may then be established by the connection manager.

At step 312, the connection manager sends outgoing packets to a host system on behalf of an application, residing on the first computing device and registered with the connection manager at step 310.

At step 314, an incoming packet is received by the connection manager from a host system.

At step 316, the connection manager transmits the packet received at step 314 to a packet cache (e.g. packet cache 276 of FIG. 5) for storage. Connection manager assigns a cache-unique identifier to the stored packet, which can be subsequently used to retrieve the stored packet from the packet cache.

At step 318, the connection manager notifies all registered applications of receipt of the received packet, stored in the packet cache at step 316.

At step 320, each registered application determines whether it is expecting a packet. If a particular application is not expecting a packet, it ignores the notification transmitted by the connection manager at step 318.

At step 322, if the registered application is expecting a packet however, the application then verifies whether the packet is intended for the application. In other words, verification is made as to whether the packet is a communication from the host system to that particular application. In this embodiment, the packet is requested and retrieved from the packet cache, using the identifier associated with the packet. The headers and sequence numbers contained in the packet are then checked by the application. It will be understood by persons skilled in the art that additional or different packet verification processes may be employed by an application.

At step 324, if it is successfully verified that the packet is intended for the application, the cache is notified by the application that the packet is in use. This allows the packet cache to remove the packet from its store and to release the identifier associated with the packet.

At step 326, execution of the applications on the first computing device continues. Further outgoing packets may be sent to the host system by repeating step 312 of method 300. As each incoming packet is received from the host system, steps of method 300 may be repeated commencing at step 314.

The connection manager in embodiments of the invention can permit the same application to register multiple threads if the application requires more than one connection. For IPsec, this means that an IKE connection can be kept separate from an ESP or AH connection. Moreover, multiple IKE, ESP, or AH connections can be opened with different re-keying times, allowing one connection that is protected by a key that is soon to expire to exist, while negotiating a new connection under a new key. Accordingly, communications over multiple connections, possibly governed by different security parameters, can be facilitated.

In embodiments of the invention where the connection manager manages all incoming packets, the connection manager also functions to better ensure that each of multiple components (e.g. applications) on a computing device receives the proper packets, even where the components may be communicating with a host over different ports or even over the same port on the computing device shared by multiple components. Furthermore, each component need not set up its own connections with a host or multiple hosts, where the connections are managed by the connection manager.

The connection manager, when used in combination with the packet cache in embodiments of the invention, can also provide additional defense against denial of service attacks in which a computing device may be bombarded with bogus packets. If components (e.g. applications) are not expecting a packet, packets received by the connection manager will not be processed by the components. Old packets can then be periodically detected and deleted from the cache.

The steps of a method of facilitating communication of packets in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A computing device for processing packets received from a host system, wherein the device comprises a processor configured to:
   notify each of a plurality of applications on the device when a packet is received at the device from the host system, wherein each of the plurality of applications is registered as a packet listener to receive notifications when packets are received at the device from the host system;
   in response to notifying each of the plurality of applications when the packet is received at the device from the host system, receive a request, from one of the plurality of applications, for the packet while the application is expecting to receive at least one packet from the host system;
   allow the application access to the packet in response to the request; and
   receive, from the application in response to a successful verification by the application that the packet is intended for the application, a notification that the packet is in use.

2. The device of claim 1, wherein in response to receiving the notification that the packet is in use, the processor is configured to make the packet unavailable to the plurality of applications on the device.

3. The device of claim 2, further comprising a store in which the packet is stored, wherein the processor is configured to make the packet unavailable to the plurality of applications on the device by removing the packet from the store.

4. The device of claim 3, wherein a different identifier is associated with each packet in the store, and wherein the processor is configured to make the packet unavailable to the plurality of applications on the device by releasing the identifier associated with the packet.

5. The device of claim 1, wherein the processor is configured to send an outgoing packet to the host system on behalf of the application, and wherein the application expects to receive at least one packet from the host system in response to the outgoing packet being sent to the host system.

6. The device of claim 1, wherein the packet comprises headers and sequence numbers, for use by the application to verify that the packet is intended for the application.

7. The device of claim 1, wherein each of the plurality of applications connects to the host system via a separate connection of a plurality of connections.

8. The device of claim 7, wherein each connection to the host system is governed by different security parameters.

9. The device of claim 1, wherein each of the plurality of applications connects to the host system is different ports on the device.

10. The device of claim 1, wherein at least a subset of the plurality of applications connects to the host system via a shared port on the device.

11. The device of claim 1, wherein the device comprises a mobile device.

12. A method of processing packets received at a computing device from a host system, the method comprising:
   registering each of a plurality of applications as a packet listener to receive notifications when packets are received at the device from the host system;
   notifying each of the plurality of applications on the device when a packet is received at the device from the host system;
   in response to notifying each of the plurality of applications when the packet is received at the device from the host system, receiving a request, from one of the plurality of applications, for the packet while the application is expecting to receive at least one packet from the host system;
   allowing the application access to the packet in response to the request; and
   receiving, from the application in response to a successful verification by the application that the packet is intended for the application, a notification that the packet is in use.

13. The method of claim 12, further comprising making the packet unavailable to the plurality of applications on the device in response to receiving the notification that the packet is in use.

14. The method of claim 13, further comprising making the packet unavailable to the plurality of applications on the device by removing the packet from a store on the device in which the packet is stored.

15. The method of claim 14, wherein a different identifier is associated with each packet in the store, and wherein the method further comprises making the packet unavailable to the plurality of applications on the device by releasing the identifier associated with the packet.

16. The method of claim 12, further comprising sending, prior to the notifying, an outgoing packet to the host system on behalf of the application, wherein the application expects to receive a packet from the host system in response to the outgoing packet being sent to the host system.

17. The method of claim 12, wherein the packet comprises headers and sequence numbers, for use by the application to verify that the packet is intended for the application.

18. The method of claim 12, wherein each of the plurality of applications connects to the host system via a separate connection of a plurality of connections.

19. The method of claim 18, wherein each connection to the host system is governed by different security parameters.

20. The method of claim 12, wherein each of the plurality of applications connects to the host system via different ports on the device.

21. The method of claim 12, wherein at least a subset of the plurality of applications connects to the host system via a shared port on the device.

22. The method of claim 12, wherein the device comprises a mobile device.

23. A non-transitory computer-readable medium, upon which instructions executable by a computing device are stored, the instructions for a method of processing packets received at the computing device from a host system, the method comprising:
   registering each of a plurality of applications as a packet listener to receive notifications when packets are received at the device from the host system;
   in response to notifying each of the plurality of applications when the packet is received at the device from the host system, notifying each of the plurality of applications on the device when a packet is received at the device from the host system;
   receiving a request, from one of the plurality of applications, for the packet while the application is expecting to receive at least one packet from the host system;
   allowing the application access to the packet in response to the request; and
   receiving, from the application in response to a successful verification by the application that the packet is intended for the application, a notification that the packet is in use.

* * * * *